United States Patent
Radhakrishnan et al.

(10) Patent No.: US 10,348,562 B2
(45) Date of Patent: Jul. 9, 2019

(54) METHODS AND SYSTEMS FOR SELECTING COMPATIBLE RESOURCES IN NETWORKED STORAGE ENVIRONMENTS

(71) Applicant: NETAPP, INC., Sunnyvale, CA (US)

(72) Inventors: Karthick Radhakrishnan, Bangalore (IN); Jacob Abraham, Bangalore (IN); Krithi BG, Bangalore (IN); Nirdosh Kumar Chouhan, Bangalore (IN)

(73) Assignee: NETAPP, INC., Sunnyvale, CA (US)

(*) Notice: Subject to any disclaimer, the term of this patent is extended or adjusted under 35 U.S.C. 154(b) by 315 days.

(21) Appl. No.: 14/992,249

(22) Filed: Jan. 11, 2016

(65) Prior Publication Data
US 2017/0201415 A1    Jul. 13, 2017

(51) Int. Cl.
*H04L 12/24* (2006.01)
*H04L 29/08* (2006.01)

(52) U.S. Cl.
CPC ........ *H04L 41/082* (2013.01); *H04L 41/0843* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 7,487,381 B1* | 2/2009 | Beaman | ............... | G06F 3/0605 709/220 |
| 2003/0028731 A1* | 2/2003 | Spiers | ............... | H04L 49/90 711/147 |
| 2003/0212775 A1* | 11/2003 | Steele | ............... | G06F 8/60 709/223 |
| 2011/0225575 A1* | 9/2011 | Ningombam | ............... | G06F 8/65 717/170 |
| 2014/0047342 A1* | 2/2014 | Breternitz | ............... | G06F 9/5061 715/735 |
| 2014/0337429 A1* | 11/2014 | Asenjo | ............... | H04L 65/403 709/204 |

* cited by examiner

*Primary Examiner* — Joshua Joo
(74) *Attorney, Agent, or Firm* — Klein, O'Neill & Singh, LLP (57) ABSTRACT

Methods and systems for a networked storage environment are provided. One method includes storing at a storage device by a processor a data structure with information regarding a plurality of compatible software and hardware components configured to operate in a plurality of configurations as part of a storage solution for using resources at a networked storage environment for storing data; obtaining by a processor executable configuration advisor information regarding a plurality of deployed components of a deployed configuration from among the plurality of configurations; comparing the deployed configuration with a latest configuration having the plurality of deployed components from among the plurality of configurations stored at the data structure; and recommending a change in at least one of the plurality of deployed components to upgrade the deployed configuration, when the deployed configuration is not the latest configuration.

20 Claims, 10 Drawing Sheets

Configuration Advisor

| Infrastructure 322A | Components 322B | Running Firmware 322C | Recomended Firmware 322D |
|---|---|---|---|
| Hypervisor | Host OS | ESXi 5.5 | ESXi 5.5 |
| Compute | HBA Firmware UCS Mgr | 2.1.2.62 2.2(3) | 2.1.2.62 2.2(4) |
| Network | NX-OS | 7.1(0)N1(1a) | 7.1(0)N1(1a) |
| Storage | Clustered Data ONTAP | 8.3 | 8.3 |

Running configuration is in good state

Configuration Check Profile: Flex Pod

Filters: ◉ All Devices ○ Selected Devices
☐ High Impact ☐ Medium Impact ☐ Low Impact
○ Best Practice ☐ Pass ☐ Fail
☐ Not Evaluated

| Impact Level | Category | Rule Target | Risk Description | Details | Other |
|---|---|---|---|---|---|
| High | License Check | Nexus 554B | Check if FCOE is enabled | Features Must be installed | |
| | | | | | |

Sidebar: Dashboard, Firmware Recommendation, Host Infrastructure, Nodes, Cluster Switches

METHODS AND SYSTEMS FOR SELECTING COMPATIBLE RESOURCES IN NETWORKED STORAGE ENVIRONMENTS

COPYRIGHT NOTICE

A portion of the disclosure herein contains material to which a claim for copyrights is made. The copyright owner, the assignee of this patent application, does not have any objection to the facsimile reproduction of any patent document as it appears in the USPTO patent files or records, but reserves all other copyrights, whatsoever.

TECHNICAL FIELD

The present disclosure relates to networked storage environments, and more particularly, to automated methods and systems for selecting compatible hardware and software components of the networked storage environment.

BACKGROUND

Networked storage environments, for example, storage area networks (SANs) and network attached storage (NAS) use various components for storing and managing data for clients. These components include hardware (for example, host servers, switches, network interface cards, host bus adapters, storage servers, storage devices and arrays) and software (for example, host applications, host operating systems, firmware, backup applications executed by host systems, storage operating systems, application programming interface (APIs) and others). As network storage environments continue to grow, it is desirable for users to efficiently determine a configuration of software and hardware components based on user needs and operating environments.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for a networked storage environment are provided. For example, one method includes storing at a storage device by a processor a data structure with information regarding a plurality of compatible software and hardware components configured to operate in a plurality of configurations as part of a storage solution for using resources at a networked storage environment for storing data; obtaining by a processor executable configuration advisor information regarding a plurality of deployed components of a deployed configuration from among the plurality of configurations; comparing the deployed configuration with a latest configuration having the plurality of deployed components from among the plurality of configurations stored at the data structure; and recommending a change in at least one of the plurality of deployed components to upgrade the deployed configuration, when the deployed configuration is not the latest configuration.

Figure 1A:
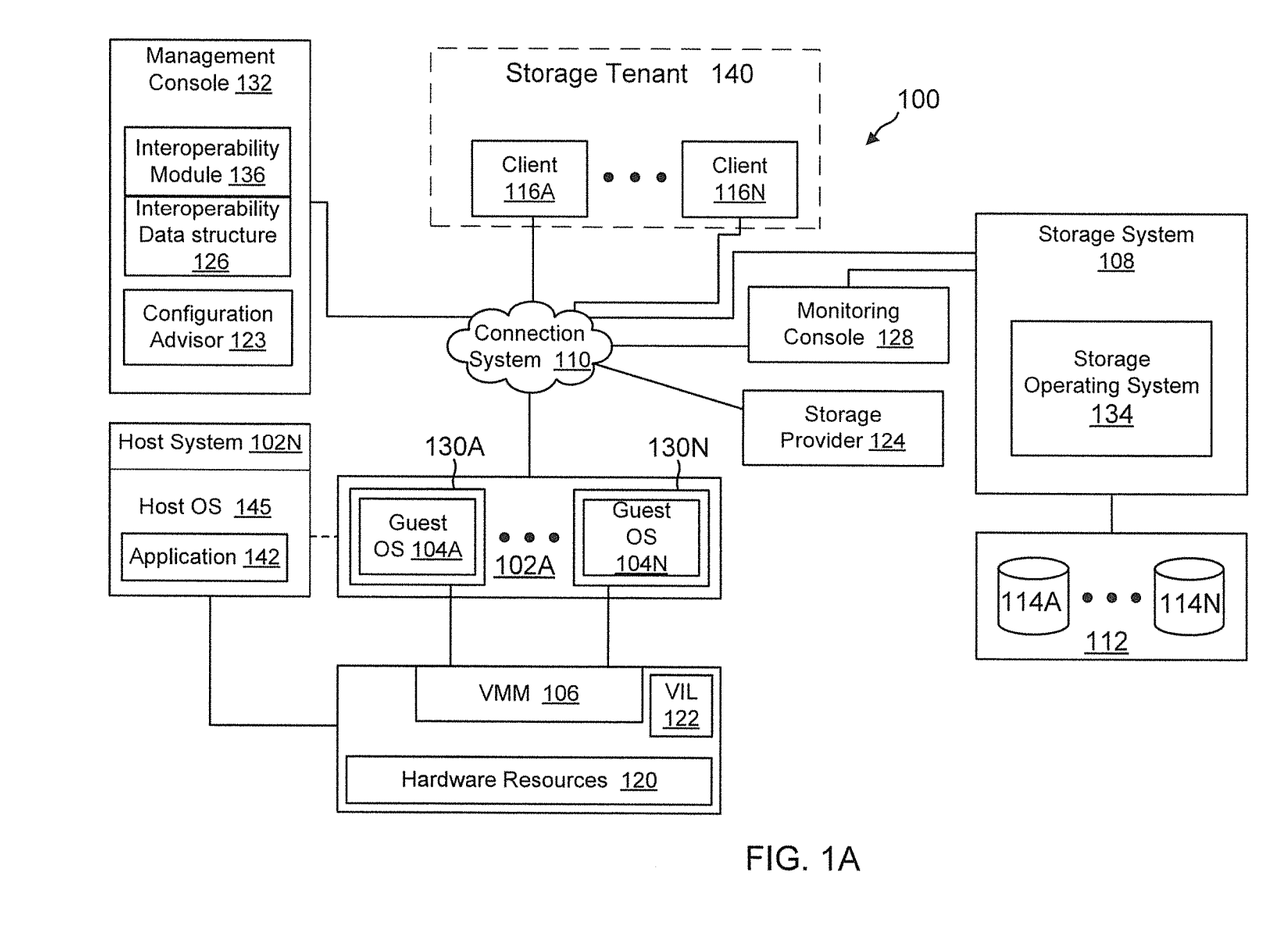
FIG. 1A shows an example of an operating environment for the various aspects disclosed herein.

System 100:

FIG. 1A shows an example of a networked storage environment 100 (also referred to as system 100) having a plurality of hardware and software components that are selected, according to one aspect of the present disclosure. In one aspect, system 100 provides a management console 132 that executes, among other modules, an interoperability module 136 and a configuration advisor 123. As an example, the interoperability module 136/configuration advisor 123 may be implemented as or include one or more application programming interface (API). The APIs may be implemented as REST APIs, where REST means "Representational State Transfer". REST is a scalable system used for building web services. REST systems/interface may use HTTP (hyper-text transfer protocol) or other protocols for communicating. When implemented as a REST API, the configuration advisor 123 receives a request and provides a response to the request. The adaptive aspects described herein are not limited to REST based APIs or any specific API type.

In one aspect, the interoperability module 136 generates or interfaces with an interoperability data structure (may also be referred to as data structure) 126 that may include various objects and data structures. Data structure 126 may be used to store information regarding different components of system 100, relationships between the components, different configurations using various components of system 100 and information regarding storage solutions having one or more configurations. Details of data structure 126 are provided below.

The configuration advisor 123 is a processor executable expert system that interfaces with the interoperability module 136 to obtain possible configurations involving a plurality of components deployed at system 100. As described below in detail, based on the various configurations, the configuration advisor 123 detects if a user is using a latest configuration. When the latest configuration is not being used, the configuration advisor 123 recommends the latest configuration with one or more upgraded components.

As an example, system 100 may also include a plurality of computing devices 102A-102N (may also be referred to individually as a host platform/system 102 or simply as server 102) communicably coupled to a storage system (or storage server) 108 that executes a storage operating system 134 via a connection system 110 such as a local area network (LAN), wide area network (WAN), the Internet and others. As described herein, the term "communicably coupled" may refer to a direct connection, a network connection, or other connections to enable communication between devices.

As an example, host system 102A may execute a plurality of virtual machines (VMs) in a virtual environment that is described below in detail. Host 102N may execute one or more application 142, for example, a database application (for example, Oracle application), an email application (Microsoft Exchange) and others. Host 102N also executes an operating system 145, for example, a Windows based operating system, Linux, Unix and others (without any derogation of any third party trademark rights). It is noteworthy that host systems 102 may execute different operating systems and applications. These applications may also have different versions. Similarly, although only one instance of storage operating system 134 is shown, the system may have a plurality of storage systems executing different storage operating system types and versions. The various hardware and software components of the host systems and the storage systems may be referred to as resources of system 100.

Clients 116A-116N (may be referred to as client (or user) 116) are computing devices that can access storage space at the storage system 108. A client can be the entire system of a company, a department, a project unit or any other entity. Each client is uniquely identified and optionally, may be a part of a logical structure called a storage tenant 140. The storage tenant 140 represents a set of users (may be referred to as storage consumers) for a storage provider 124 (may also be referred to as a cloud manager, where cloud computing is being utilized). Where a storage provider 124 is being used, the client accesses storage and protection levels through the storage provider. It is noteworthy that the adaptive aspects of the present disclosure are not limited to using a storage provider or a storage tenant and may be implemented for direct client access.

In one aspect, storage system 108 has access to a set of mass storage devices 114A-114N (may be referred to as storage devices 114) within at least one storage subsystem 112. The mass storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

Because storage sub-system 112 may include different storage types, it is desirable to be aware which storage device is compatible with a particular storage operating system or storage operating system version. Furthermore, as described below, the storage system 108 and the storage sub-system 112 may include other hardware components, for example, network interface cards, host bus adapters (HBAs), converged network adapters (CNAs), switches, memory controllers and others. These components have different firmware versions and may use different protocols for operation, for example, Fibre Channel, iSCSI (the Small Computer Systems Interface (SCSI) protocol encapsulated over TCP (Transmission Control Protocol)/IP (Internet Protocol)), Fibre Channel over Ethernet (FCOE), Ethernet and others. Thus for a user, for example, a storage administrator, storage architect and others that may desire to build or use a networked storage infrastructure, it is desirable to know how these various components can be configured and if the components are compatible.

Referring back to FIG. 1A, as an example, the storage system 108 may provide a set of logical storage volumes (or logical unit numbers (LUNs)) that presents storage space to clients and VMs for storing information. Each volume may be configured to store data files (or data containers or data objects), scripts, word processing documents, executable programs, and any other type of structured or unstructured data. From the perspective of one of the client systems, each volume can appear to be a single drive. However, each volume can represent storage space at one storage device, an aggregate of some or all of the storage space in multiple storage devices, a RAID group, or any other suitable set of storage space.

The storage operating system 134 organizes storage space at storage devices 114 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 114 based on a request. The request may be based on file-based access protocols, for example, the Common Internet File System (CIFS) protocol or Network File System (NFS) protocol, over TCP/IP. Alternatively, the request may use block-based access protocols, for example, iSCSI and SCSI encapsulated over Fibre Channel (FCP).

In a typical mode of operation, a client transmits one or more input/output (I/O) commands, such as a CFS or NFS request, over connection system 110 to the storage system 108. Storage system 108 receives the request, issues one or more I/O commands to storage devices 114 to read or write the data on behalf of the client system, and issues a CIFS or NFS response containing the requested data over the network 110 to the respective client system.

Although storage system 108 is shown as a stand-alone system, i.e. a non-cluster based system, in another aspect, storage system 108 may have a distributed architecture; for example, a cluster based system that is described below in detail with respect to FIG. 2.

System 100 may also include one or more monitoring console 128 that interfaces with the storage operating system 134 for sending and receiving performance data for example, latency (i.e. delay) in processing read and write requests, data transfer rates and other information. It is noteworthy that system 100 may include other management applications that are used for provisioning storage, managing devices/resources, managing backups and restore operations (may be referred to as storage services). These applications or specific application versions are compatible with certain hardware and software. It is desirable for a user to know which application type/version may be best suited for a specific networked storage environment. The configuration advisor 123 and the interoperability module 136 using data structure 126 enables this function, as described below in detail.

As an example, system 100 may also include a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A includes/provides a virtual machine environment executing a plurality of VMs 130A-130N that may be presented to client computing devices/systems 116A-116N. VMs 130A-130N execute a plurality of guest OS 104A-104N (may also be referred to as guest OS 104) that share hardware resources 120. Application 142 may be executed within VMs 130. As described above, hardware resources 120 may include storage, CPU, memory, I/O devices or any other hardware resource.

In one aspect, host platform 102A interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host platform 102. The VMM 106 may include or interface with a virtualization layer (VIL) 122 that provides one or more virtualized hardware resource to each OS 104A-104N.

In one aspect, VMM 106 is executed by host platform 102A with VMs 130A-130N. In another aspect, VMM 106 may be executed by an independent stand-alone computing system, referred to as a hypervisor server or VMM server and VMs 130A-130N are presented at one or more computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1A may be customized depending on the virtual environment to implement the aspects of the present disclosure. Furthermore, VMM 106 (or VIL 122) may execute other modules, for example, a storage driver, network interface and others, the details of which are not germane to the aspects described herein and hence have not been described in detail. The virtualization environment may use different hardware and software components and it is desirable for one to know an optimum/compatible configuration.

System 100 or a portion thereof maybe used in a data center where various storage devices are deployed with other hardware and software components from different sources/vendors in one or more configurations to perform certain tasks. The different components may evolve independently in their respective life cycles to newer versions, either for solving defects or for adding new features.

To benefit most from system 100, a user often has to continuously upgrade individual components for best practice configurations and optimum utilization. Often this process is complex for storage administrators and professional service engineers, as several components may evolve concurrently. As a result, deployed configurations of system 100 may be different from recommended optimum or the best practice configuration. This may result in loss of efficiency and resource utilization.

In one aspect, the configuration advisor 123 is a processor executable tool that checks best practices for a deployed configuration with a plurality of components. Configuration advisor 123 integrates through a Web API with the interoperability module 135 to obtain best-practice configurations for deployed components of system 100.

In one aspect, the configuration advisor 123 automatically fetches information regarding a currently deployed configuration and recommends configuration upgrades to a user. The suggested upgrades provide compatibility and interoperability among different components. Thus, the configuration advisor 123 provides an automated recommendation process for a deployed configuration in system 100, as described below in detail.

In one aspect, the configuration advisor 123 uses an expert system based design. To provide recommendation to upgrade a configuration, the configuration advisor 123 uses "forward reasoning". Most decision-making is performed by an inference engine using certain rules.

The inference engine using forward reasoning searches inference rules until it finds a rule where the "IF" clause is known to be true. When the rule is found, the "THEN" clause can be inferred, resulting in addition of new information to a dataset of the inference engine. In other words, the inference engine starts with some facts and applies rules to find possible conclusions.

As an example, the configuration advisor 123 operates by repeating the following sequence of operations: (a) Examine rules to find a rule where the "If" portion is satisfied by the current contents of a working memory; and (b) Initiate the rule by adding to the working memory the parameters specified by the rule. This cycle continues until no rules are found with satisfied "If" parts. Details of the processes executed by the configuration advisor 123 are provided below after the underlying data structure 126 is described with respect to FIG. 1B.

Figure 1B:
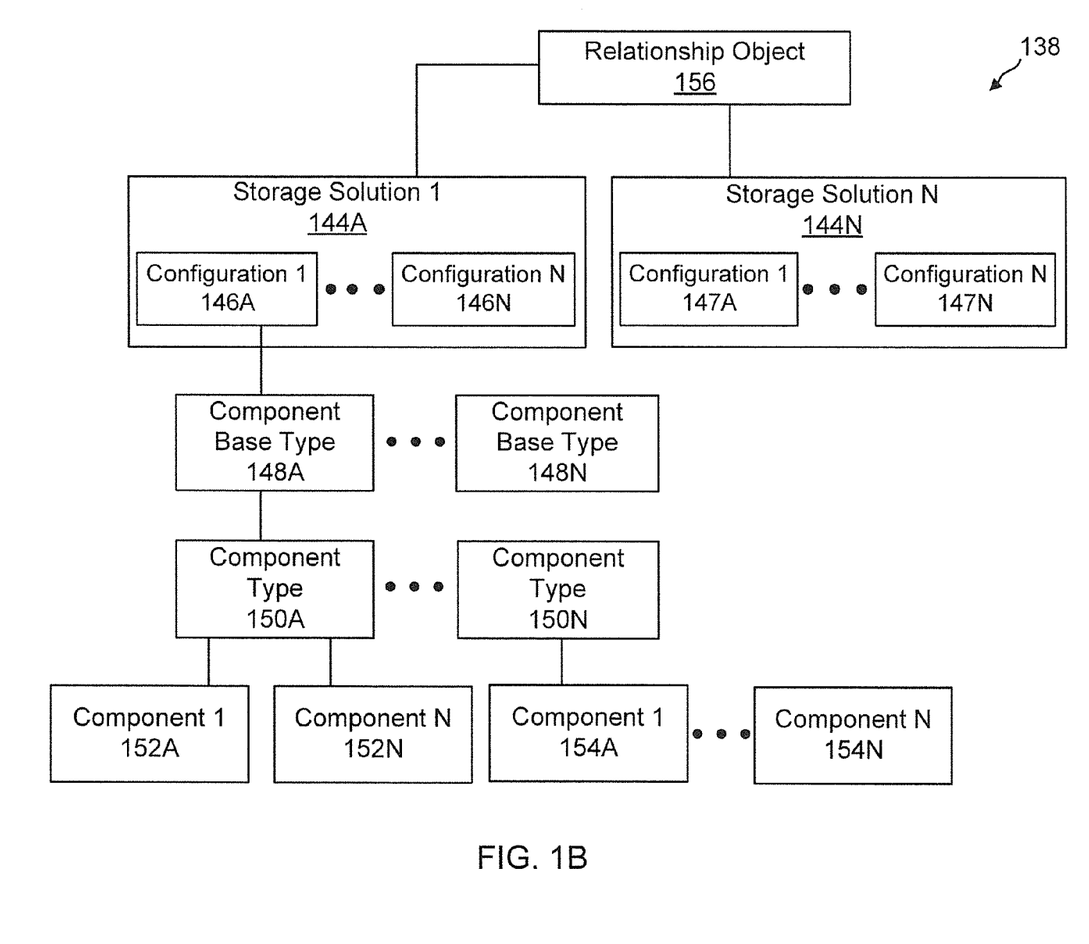
FIG. 1B shows an example of a data structure format, used according to one aspect of the present disclosure.

Data Structure Schema:

FIG. 1B shows an example of a format (or a database schema) for data structure 126 that is used by the interoperability module 136 to provide configuration information to configuration advisor 123. As an example, the format includes a plurality of storage solution objects 144A-144N, each identifying a storage solution. The term storage solution as used herein may also be referred to as a collection to include multiple configuration and configuration is intended to include a combination of components' that are compatible with each other within a networked storage environment. Each component of a storage solution may be a resource that is used to store and protect data. Storage solution objects 144A-144BN have a unique identifier and name. Each storage solution object may be associated with or include a plurality of configuration objects 146A-146N/1478A-147N that define specific configurations for a particular storage solution. Each configuration has a name, a configuration identifier, a version identifier, an owner of the configuration, if any and other data.

Each configuration may include a plurality of component base type objects 148A-148N that are in turn are associated with a plurality of component type (also referred to as entity type) objects 150A-150N. For example, operating systems in general may be identified by a component base type object, while a host operating system may be a component type. The component base type objects 148A-148N are identified by a base type identifier and a name that identifies a base type. The component type objects 150A-150N are also identified by a unique identifier and name.

Each component type object is associated with a plurality of component (may also be referred to as an entity) objects 152A-152N/154A-154N. Continuing with the above example, where the base type is an operating system and the component type is a host operating system, a Windows operating system may be identified by a component object. Each component object has attributes and properties, for example, a unique identifier, name, version number, vendor identifier for identifying the vendor that provided the component, owner, creating date, modification date and brief description. For example, the attributes for operating systems for host devices having a specific version may include Windows 8.1, Apache Tomcat 8.1m Java 8, servlet 3.1 or JDBC 4.2.

Different solutions may be related to each other with overlapping components. A plurality of solutions that may be connected or have related components may be referred to as a collection group. A relationship object 156 identifies related solutions. The relationship object 156 includes a unique identifier for identifying the relationship.

Figure 1C:
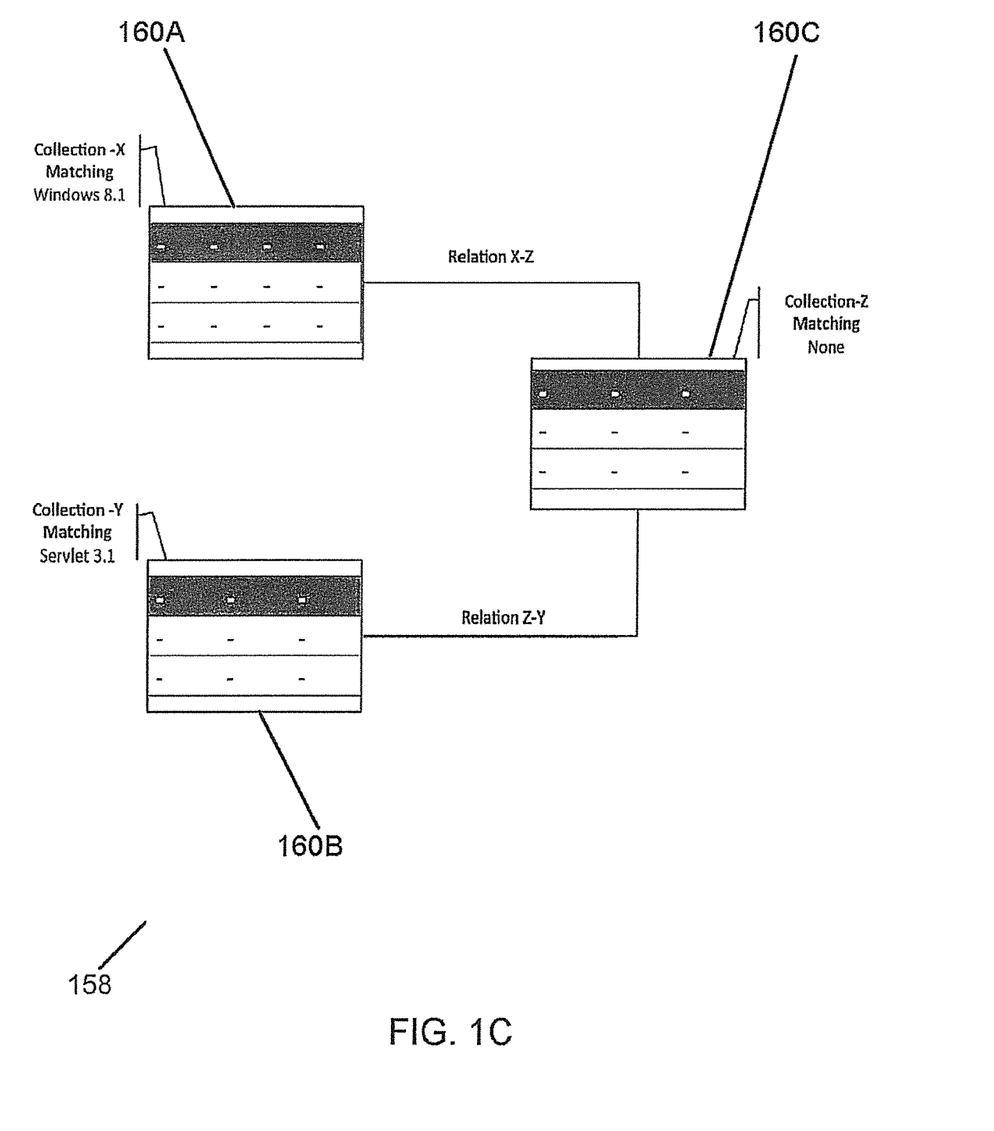
FIG. 1C shows an example of a relationship object, used according to one aspect of the present disclosure.

FIG. 1C shows an example 158 with relationships between solutions 160A, 160B and 160C. In this example, solution 160A is related to 160C and solution 160B is related to 160C. As an example, solution 160A uses Windows 8.1 and solution 160B uses Servlet 3.1.

The relationship object 156 may be used to develop a spanning tree for a user that is trying to determine a configuration using certain components. It is noteworthy that although only one relationship object is shown as an example, there may be numerous relationship objects for the plurality of configurations and storage solutions.

In one aspect, data structure 126 may include the following mappings for managing relationships between different components:

Map[Component, Solution]
Map[Solution, CollectionGroup]
Map[Component Type, Component]
Map[Component, Solution]

Clustered System:

Before describing the processes executed by the configuration advisor 123, the following describes a clustered storage system. FIG. 2 shows a cluster based storage environment 200 having a plurality of nodes operating as resources to store data on behalf of clients. System 200 includes the management console 132 with the configuration advisor 123 and the interoperability module 136 described above in detail.

Storage environment 200 may include a plurality of client systems 204.1-204.N as part of or associated with storage tenant 140, a clustered storage system 202 (similar to storage system 108) and at least a network 206 communicably connecting the client systems 204.1-204.N, the management console 132, the storage provider 124 and the clustered storage system 202. It is noteworthy that these components may interface with each other using more than one network having more than one network device.

The clustered storage system 202 includes a plurality of nodes 208.1-208.3, a cluster switching fabric 210, and a plurality of mass storage devices 212.1-212.3 (may be referred to as 212 and similar to storage device 114). Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and an management module 218.2, and node 208.3 includes an network module 214.3, a storage module 216.3, and an management module 218.3.

The network modules 214.1-214.3 include functionality that enable the respective nodes 208.1-208.3 to connect to one or more of the client systems 204.1-204.N (or the management console 132) over the computer network 206. The network modules handle file network protocol processing (for example, CFS, NFS and/or iSCSI requests). The storage modules 216.1-216.3 connect to one or more of the storage devices 212.1-212.3 and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212 and makes it available to monitoring console 128.

A switched virtualization layer including a plurality of virtual interfaces (VIFs) 219 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs"), in which each SVM represents a single storage system namespace with separate network access. A SVM may be designated as a resource on system 200. Each SVM has a client domain and a security domain that are separate from the client and security domains of other SVMs. Moreover, each SVM is associated with one or more VIFs 219 and can span one or more physical nodes, each of which can hold one or more VIFs and storage associated with one or more SVMs. Client systems can access the data on a SVM from any node of the clustered system, through the VIFs associated with that SVM.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Figure 2:
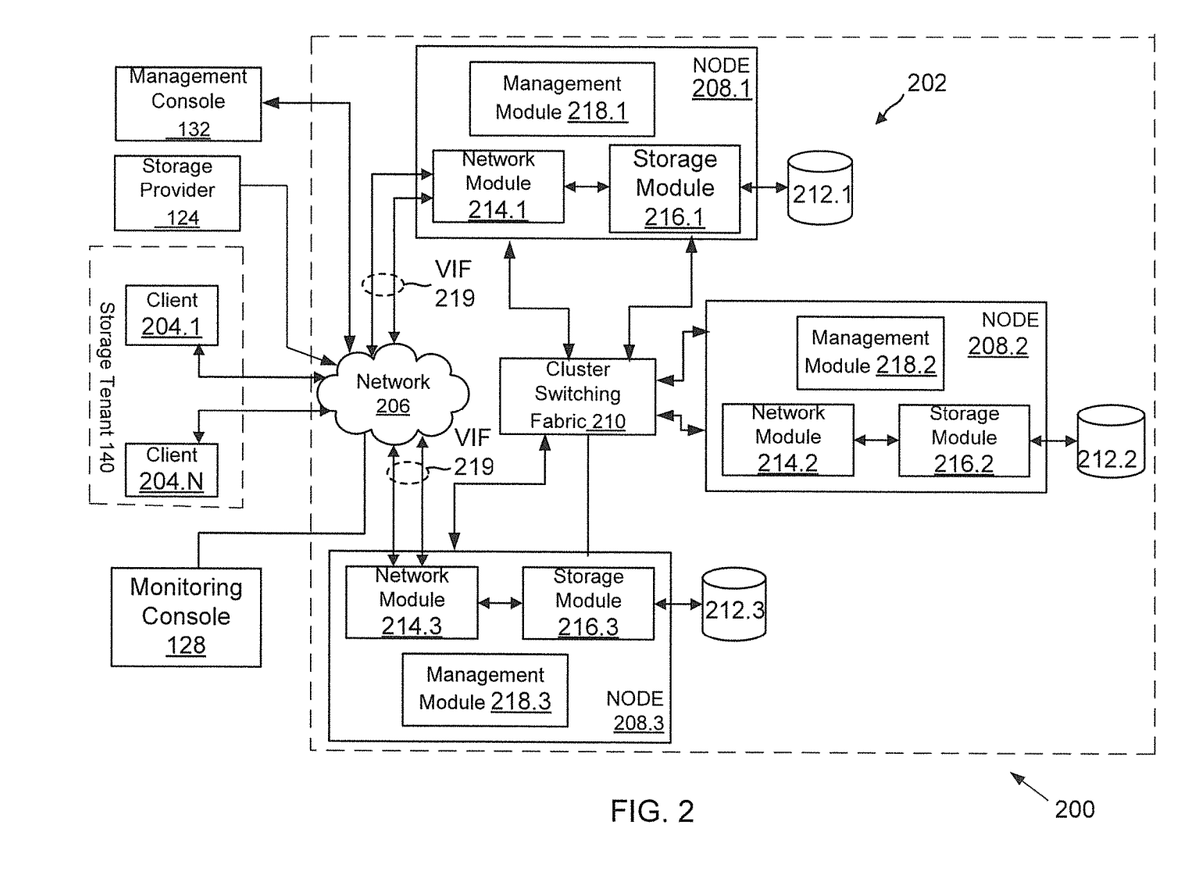
FIG. 2 shows an example of a clustered storage system, used according to one aspect of the present disclosure.

Although FIG. 2 depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

As shown above the clustered system has various resources with hardware and software components. The interoperability module 136 assists in finding compatible components and configurations, as described below in detail.

Figure 3A:
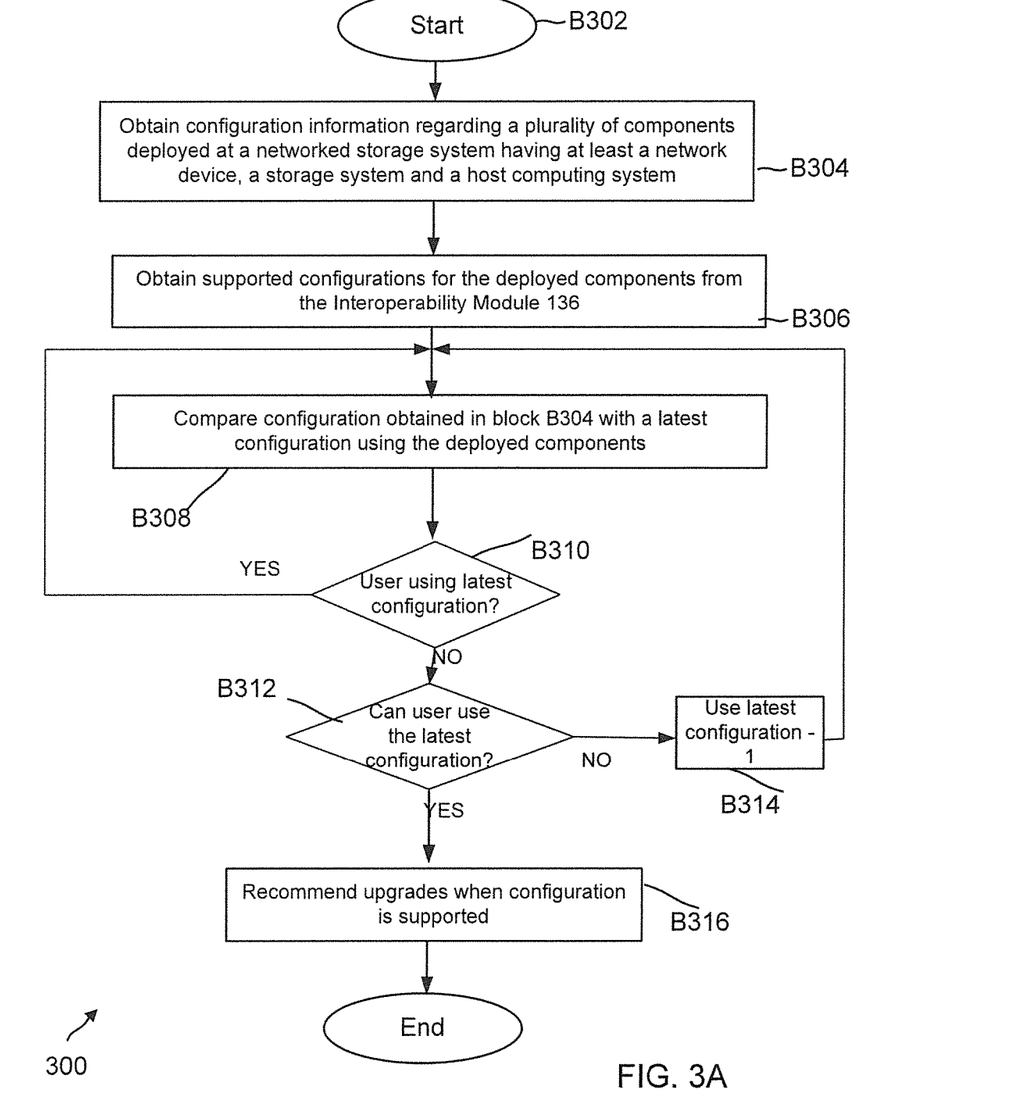
FIG. 3A shows a process for advising a configuration upgrade, according to one aspect of the present disclosure.

Process Flows:

FIG. 3A shows a process 300 executed by the configuration advisor 123, according to one aspect of the present disclosure. The process begins when a user has deployed a configuration in a data center having a plurality of components, for example, a hypervisor component (in a virtual environment), a compute layer having a plurality of computing components, a management layer, a network layer with a switch, a storage layer having a storage operating system and other components. Each component is executed by firmware or operating system (OS) and each firmware and OS has particular revisions and versions. As an example, assume that a deployed configuration includes components Comp1-Compn, where Comp1-Compn are the different components in different layers, for example, compute, storage, network, hypervisor and management layers. Assume that the deployed configuration is Config1 having the plurality of components. In block B304, the configuration advisor 123 obtains the information regarding the various components, for example, the component identifiers and the information related to the components, for example, firmware version and others.

In block B306, the configuration advisor 123 requests configuration information from interoperability module 136 with different possible configurations involving the plurality of deployed components and component types. The interoperability module 136 maintains the information at data structure 126 described above with respect to FIG. 1B. As an example, the interoperability module 136 provides the identity of the various configurations, the components that are included in the configuration with details regarding the components for example, a firmware or OS version number and other related information. Assume that the interoperability module 136 provides ConfigA-ConfigX that may be deployed for the existing components of Config1 that is already in operation.

In block B310, the user configuration Config1 is compared with the latest configuration received from the interoperability module 136. The configuration advisor 123 determines if the user configuration is the latest configuration. If yes, the process simply loops back or waits.

If the user is not using the latest configuration, then in block B312, the configuration advisor 123 determines if the user can use the latest configuration. If no, then in block B314, the process iterates to the next configuration that was received from the interoperability module 136.

If the user can use the latest configuration, then the configuration advisor 123 provides the recommended upgrades for one or more components of the configuration to the user in block B316. Thereafter, the process ends.

Figure 3B:
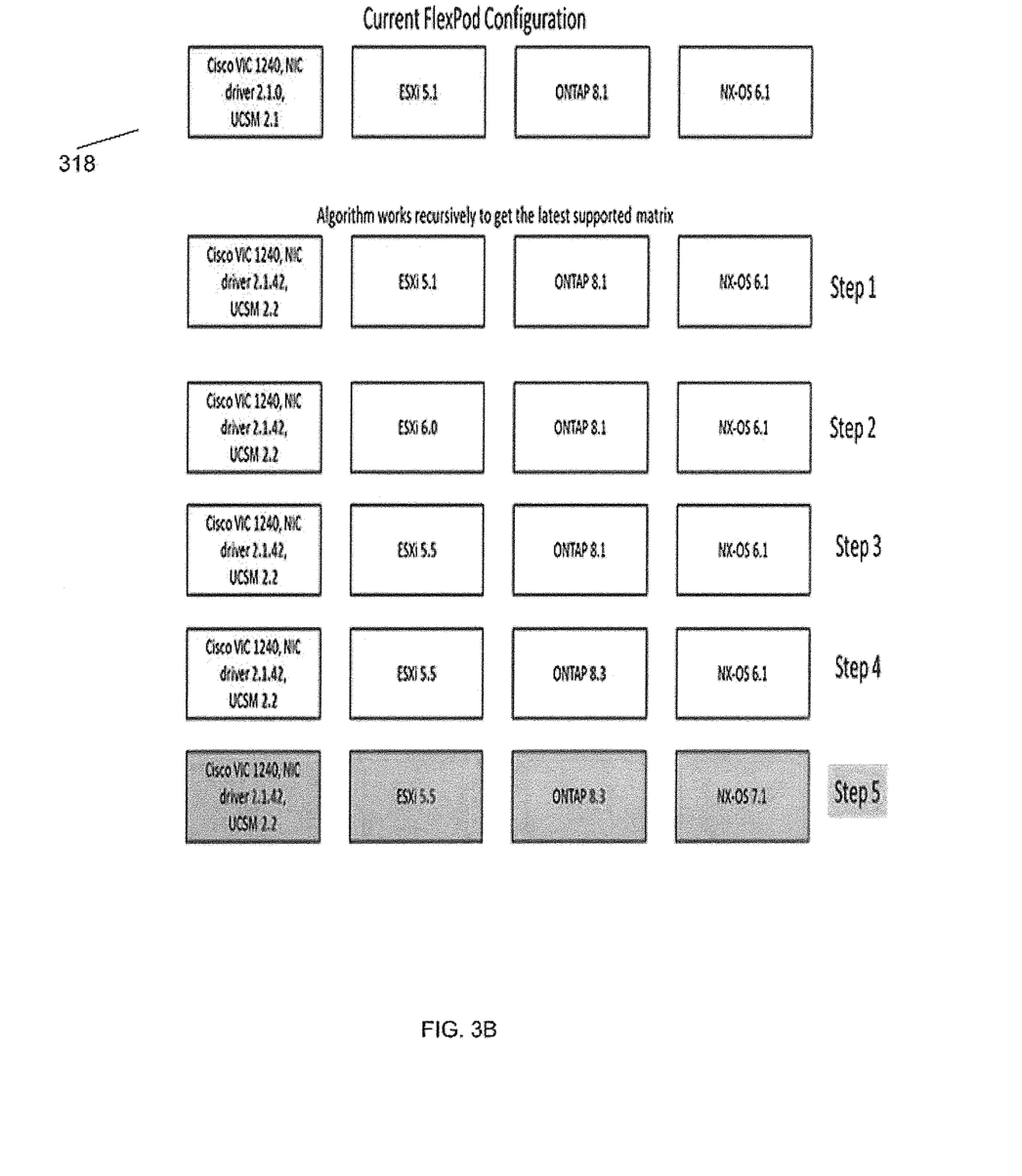
FIG. 3B shows an example of configuration upgrade using the process of FIG. 3A.

FIG. 3B shows an example for executing the process flow of FIG. 3A. The example is described in the context of a "FlexPod" (without derogation of any trademark rights) configuration, but is not limited to any specific network configuration type. Flexpod is an integrated computing, networking, and storage solution configuration developed by Cisco Inc. and NetApp (assignee of the present application), The FlexPod configuration includes a plurality components include servers (Unified Computing System), switches and storage systems. The components also include a management component designated as UCSM (Unified Computing System Manager). The servers include a host bus adapter (HBA) for accessing storage devices and network interface card (NICs) for storage network communication (or converged adapters that can handle both network and storage traffic). The HBA drivers are referred to as VIC (virtual interface card) drivers. The servers may be implemented in a virtual machine using hypervisors. The firmware for the hypervisors is referred to as ESXi (without derogation of any trademark rights of VMWare Corp.).

FIG. 3B shows a current Flexpod configuration in segment 318. The configuration shows a CISCO VIC 1240, NIC driver version 2.1.0 and a UCSM version 2.1. The configuration uses a host operating system version ESXI 5.1, a storage operating system ONTAP 8.10 and a network switch (e.g. Nexus switch) operating system, NX-OS 6.1.

The pseudo code for executing the process of FIG. 3A for life cycle management of various components in a FlexPod configuration is provided below:

FlexPod_firmware = ${IMT DUMP}; IMT is the Interoperability Module 136
$current_vic_driver_version = ${CURRENT_VIC_VERSION} ## collected from Step #2 of Figure 3B
$current_ESXi_version = ${CURRENT_ESXI_VERSION} ### collected from

```
step #2 of Figure 3B
$firmware_hash                                              =
&get_all_supported_firmwares_from_IMT($current_vic_driver_version,
$current_ESXi_version);
foreach $somekey (keys %$firmware_hash) {
my $vic_version = get_latest_vic_version( );
my $esxi_version = get_latest_esxi_version( );
my $nxos_version = get_latest_nxos_version( );
my $ontap = get_latest_ontap( );
my $ucsm = get_latest_ucsm( );
&check_supportability_comptaibility_w_each_firmware($vic_version,
$esxi_version, $nxos_version, $ontap, $ucsm);
If NOT supported {
Identify non-supported firmware component;
Purge it from the list; ### now the latest version will be (latest −1)
Goto the method &get_all_supported_firmwares_from_IMT( ) and repeat;
    }
        }
```

The following provides a detail explanation for executing the foregoing pseudocode for a FlexPod configuration:

1. Obtain all available configurations from the Interoperability module 136 regarding a "FlexPod_SAN" using the iSCSI and FCoE protocols.
2. Filter the obtained configurations to retrieve configurations that support a "current VIC card" (for example, 1240, FIG. 3B).
3. Filter the above list and retrieve configurations that support a Host OS type: VMware ESXi
4. From the retrived configurations, form a list (L1) with combinations of "ENIC" and "FNIC" firmware versions that have same common UCSM version. The term ENIC means Ethernet network interface card and FNIC means Fibre Channel network interface card. In one aspect, the sorting is done such that ENIC is given a higher priority. First a sorted list of available ENIC versions is prepared in a descending order. Next another sorted list of available FNIC versions is prepared in a descending order. Assume that length of ENICS=5 and length of FNICS=4. Then the combinations are made by ordering the sum of each combination: [(0, 0), (0, 1), (1, 0), (0, 2), (1, 1), (2, 0), (0, 3), (1, 2), (2, 1), (3, 0), (1, 3), (2, 2), (3, 1), (4, 0), (2, 3), (3, 2), (4, 1), (3, 3), (4, 2), (4, 3)]. Here each element is the index in ENICS and FNICS, respectively
5. For the highest (ENIC, FNIC) pair in list L1, list all configurations that support the determined ENIC, FNIC and the common UCSM.
6. From the above list form sorted list L2, with supported Host OS in a descending order.
7. If the list L2 is empty, remove highest (ENIC, FNIC) pair in list L1, and go back to step 5 above.
8. Retrieve all configurations with the highest Host OS revision from list L2.
9. From the above configurations; make a list L3 with various ONTAP OS (i.e. storage operating system) versions supported in a descending order.
10. If list L3 is empty, remove highest Host OS in the list L2, and go back to step 8.
11. For the highest ONTAP in list L3, find the latest NX-OS supported for the Cisco Nexus model from the "FlexPod_SAN_Switch" data from the Interoperability module 136.
12. If no NX-OS is found, remove highest ONTAP OS from L3 and go back to step 10. If NX-OS is found, then the values ENIC, FNIC, UCSM, Host OS, ONTAP OS are recommended, as shown in the last step of FIG. 3B (i.e. step 5).

In some instances, no life cycle management recommendation is provided. Examples of some of the instances are provided below in context with the FlexPod configuration described above:
   (i) When FlexPod is using different models of switches for a first Nexus-A and Nexus-B, an appropriate message is displayed with no life cycle management recommendations. An example of message to the user is: "Firmware Recommendation is not available due to mismatch between Switch models."
   (ii) Host data is not collected as user has not entered the credentials or credentials are invalid. An example of a message to the user is: "Firmware Recommendation is not available as user credentials not provided/invalid."
   (iii) Switch model not found. This case may occur when a "show inventory" command output is missing on the switches. An example of a message to the user is: "Firmware Recommendation is not available. Unable to find Switch model."
   (iv) NX-OS version not found. This case may occur when a "show version" command output is missing on both the switches. An example of a message to the user is: "Firmware Recommendation is not available. Unable to find NX-OS version."

In some instances, an error message is provided with a recommendation. For example, when FlexPod is using different NX-OS for a Nexus-A and Nexus-B switches, then a message: "Mismatch in NX-OS versions of the Nexus Switches" is provided. Another example is when nodes are running different storage operating system versions. In that case a message maybe: "Mismatch in Storage OS versions of the Controllers" Is provided.

Figure 3C:
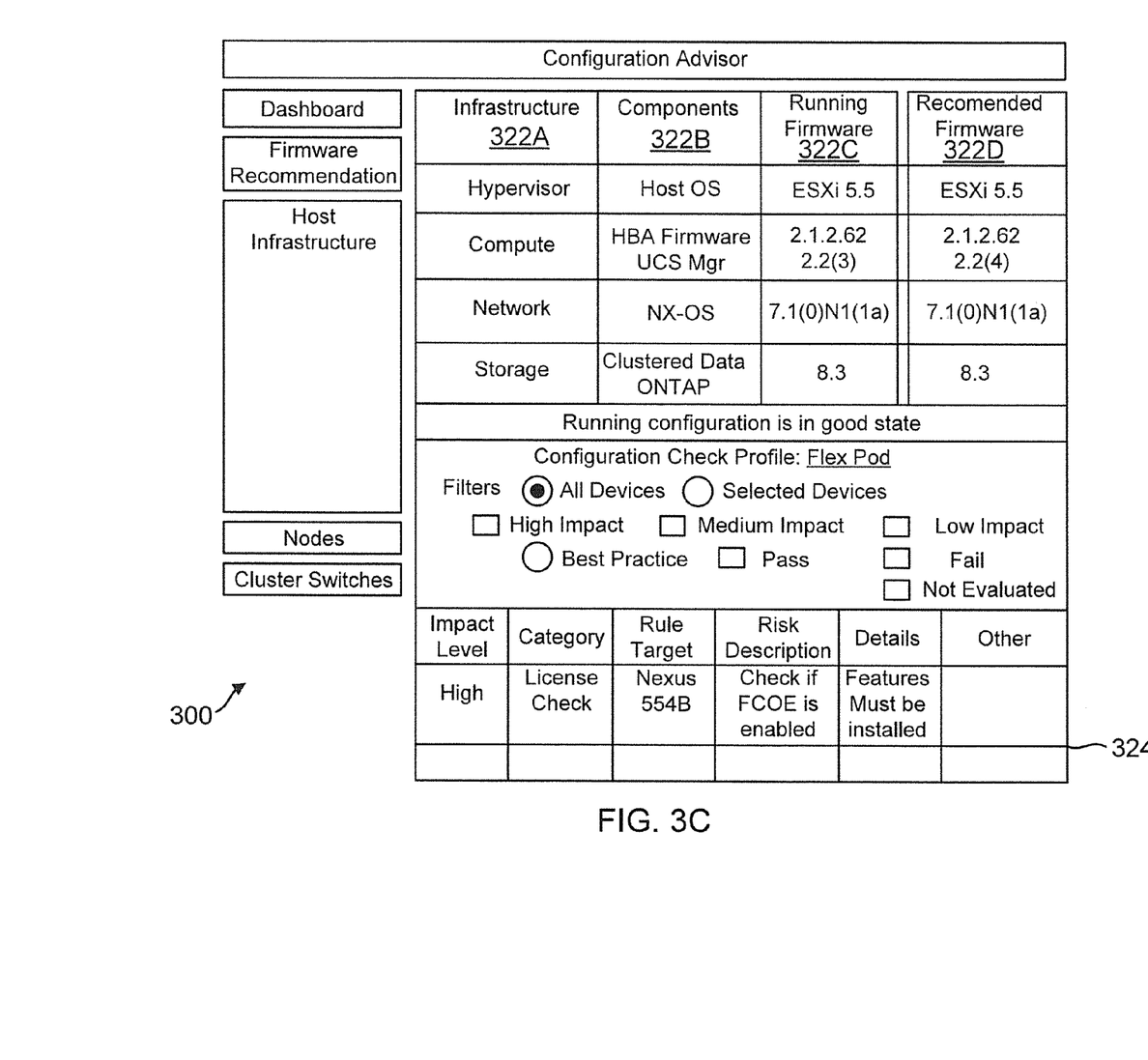
FIG. 3C shows an example of a graphical user interface for a configuration upgrade, according to one aspect of the present disclosure.

FIG. 3C shows an example of a screenshot 320 provided by the configuration advisor 123 for the FlexPod configuration described above, according to one aspect of the present disclosure. The screenshot 320 illustrates the component type under column 322A, the components within the component type in column 322B, the current firmware under column 322C and the recommended upgrade in column 322D after executing the process steps of FIG. 3A. Screenshot 320 further shows a configure profile check segment 324 where no recommendations are provided.

Figure 4A:
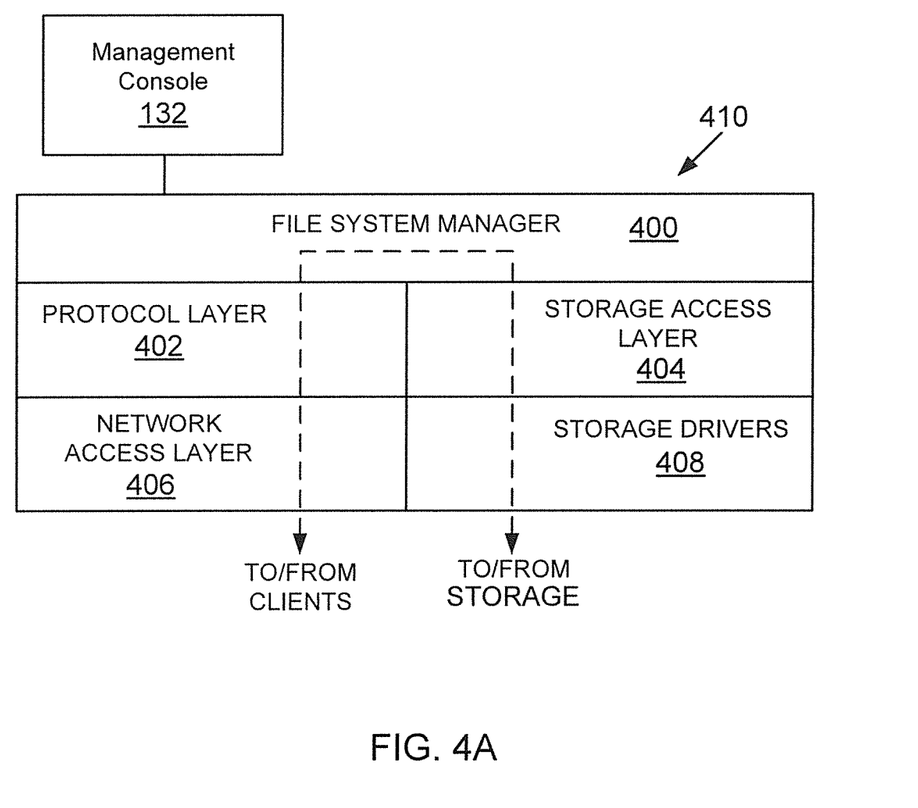
FIG. 4A shows an example of a storage operating system, used according to one aspect of the present disclosure.

Operating System:

FIG. 4A illustrates a generic example of storage operating system 410 (or 134, FIG. 1A) executed by node 208.1, according to one aspect of the present disclosure. The storage operating system 410 interfaces with the management console 132 for receiving information regarding various storage system components. The information is used to build storage solutions and then used by the interoperability module 136 and the configuration advisor 123, as described above.

In one example, storage operating system 410 may include several modules, or "layers" executed by one or both of network module 214 and storage module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 410 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others.

Network access layer 406 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 410.

The storage operating system 410 may also include a storage access layer 404 and an associated storage driver layer 408 to allow Storage module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 4B:
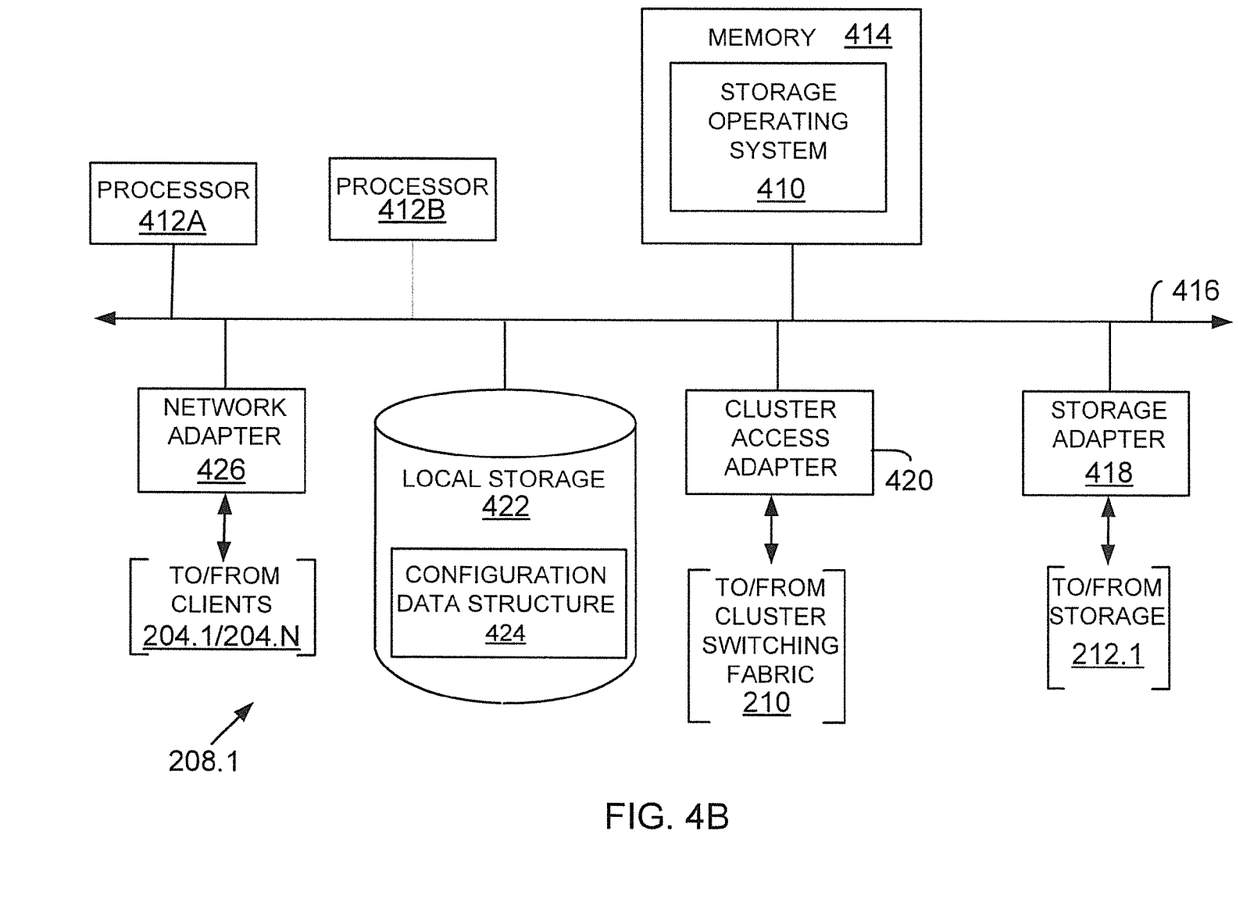
FIG. 4B shows an example of a storage system node, according to one aspect of the present disclosure.

Storage System Node:

FIG. 4B is a block diagram of a node 208.1 that is illustratively embodied as a storage system comprising of a plurality of processors 412A and 412B, a memory 414, a network adapter 426, a cluster access adapter 420, a storage adapter 418 and local storage 422 interconnected by a system bus 416. Node 208.1 may be used to provide configuration information regarding various hardware and software components to management console 132. The information is then stored at data structure 126 for executing the process flows described above.

Processors 412A-412B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 422 comprises one or more storage devices utilized by the node to locally store configuration information for example, in a configuration data structure 424.

The cluster access adapter 420 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and Storage modules are implemented on separate storage systems or computers, the cluster access adapter 420 is utilized by the network/storage module for communicating with other network/storage modules in the cluster 100.

Each node 208.1 is illustratively embodied as a dual processor storage system executing a storage operating system 410 (similar to 134, FIG. 1) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 412A executes the functions of the network module 214 on the node, while the other processor 412B executes the functions of the storage module 216.

The memory 414 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 410 portions of which is typically resident in memory and executed by the processing elements, functionally organizes the node 208.1 by, inter alia, invoking storage operation in support of the storage service implemented by the node.

The network adapter 426 comprises a plurality of ports adapted to couple the node 208.1 to one or more clients 204.1/204.N over point-to-point links, wide area networks, virtual private networks implemented over a public network (Internet) or a shared local area network. The network adapter 426 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 418 cooperates with the storage operating system 410 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 418 comprises a plurality of ports having input/output (I/O) interface circuitry that couples to the storage devices over an I/O interconnect arrangement, such as a conventional high-performance, FC link topology.

Figure 5:
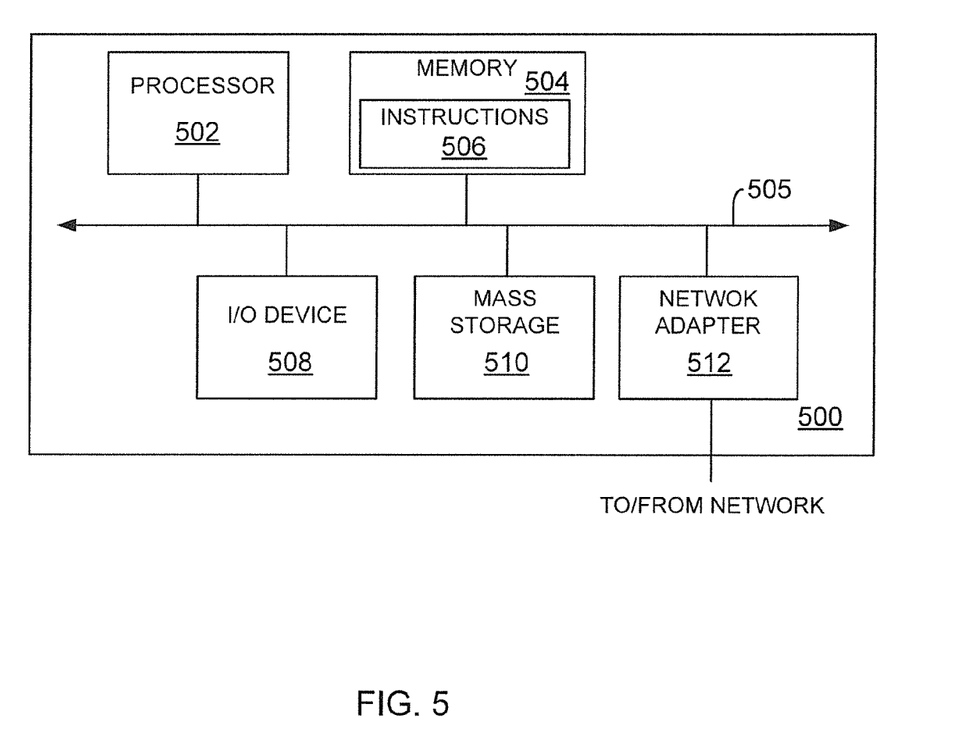
FIG. 5 shows an example of a processing system, used according to one aspect of the present disclosure.

Processing System:

FIG. 5 is a high-level block diagram showing an example of the architecture of a processing system 500 that may be used according to one aspect. The processing system 500 can represent host system 102, management console 132 executing the configuration advisor 123 and the interoperability module 136, monitoring console 128, clients 116, 204 or storage system 108. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIG. 3A described above, may reside in and execute (by processors 502) from memory 504. Instructions for implementing the configuration advisor 123 and the interoperability module 136 may also be stored at memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Thus, a method and apparatus for managing life cycle management of various resources in a networked storage environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

generating by a processor, relationship objects for a data structure indicating relationships between components of computing, networking and storage resources used for storing and retrieving data in a networked storage system in a first configuration of a first storage solution having a plurality of configurations;

wherein the relationship objects define a relationship between the first and a second storage solution with overlapping compatible components, and the relationship objects provide a spanning tree structure for making changes to the first configuration;

determining by the processor, based on the data structure, that the first configuration is not upgradable to a latest configuration, different from the first configuration;

iterating through the data structure by the processor, to identify a second configuration from the second storage solution that is upgradable to the latest configuration;

generating a message by the processor, upon detecting any incompatibility between certain components of one of the latest configuration and the second configuration; and indicating by the processor that the second configuration is unsupported, when a plurality of components of the second configuration do not match any configuration in the data structure.

2. The method of claim 1, wherein the message is an error message that is generated when two nodes of the networked storage system execute different storage operating system versions.

3. The method of claim 1, wherein the message is an error message that is generated when two same network switches of the networked storage system use a different firmware version.

4. The method of claim 1, wherein the data structure includes a first solution object for uniquely identifying the first storage solution and the first solution object is associated with a plurality of configuration objects associated with the plurality of configurations.

5. The method of claim 4, wherein each configuration object provides a unique configuration identifier, a configuration version identifier and a configuration owner.

6. The method of claim 5, wherein each configuration object is associated with a plurality of component base type objects, each component base type object indicating a component type that is uniquely identified.

7. The method of claim 6, wherein each component base type object is associated with a plurality of component objects that are associated with the plurality of components, each component object having attributes providing information related to the plurality of components.

8. A non-transitory machine readable medium having stored thereon instructions comprising machine executable code which when executed by a machine, causes the machine to:
generate by a processor, relationship objects for a data structure indicating relationships between components of computing, networking and storage resources used for storing and retrieving data in a networked storage system in a first configuration of a first storage solution having a plurality of configurations;
wherein the relationship objects define a relationship between the first and a second storage solution with overlapping compatible components, and the relationship objects provide a spanning tree structure for making changes to the first configuration;
determine by the processor, based on the data structure, that the first configuration is not upgradable to a latest configuration, different from the first configuration;
iterate through the data structure by the processor, to identify a second configuration from the second storage solution that is upgradable to the latest configuration;
generate a message by the processor, upon detecting any incompatibility between certain components of one of the latest configuration and the second configuration; and
indicate by the processor that the second configuration is unsupported, when a plurality of components of the second configuration do not match any configuration in the data structure.

9. The non-transitory machine readable medium of claim 8, wherein the message is an error message that is generated when two nodes of the networked storage system execute different storage operating system versions.

10. The non-transitory machine readable medium of claim 8, wherein the error message is generated when two same network switches of the networked storage system use a different firmware version.

11. The non-transitory machine readable medium of claim 8, wherein the data structure includes a first solution object for uniquely identifying the first storage solution and the first solution object is associated with a plurality of configuration objects associated with the plurality of configurations.

12. The non-transitory machine readable medium of claim 11, wherein each configuration object provides a unique configuration identifier, a configuration version identifier and a configuration owner.

13. The non-transitory machine readable medium of claim 12, wherein each configuration object is associated with a plurality of component base type objects, each component base type object indicating a component type that is uniquely identified.

14. The non-transitory machine readable medium of claim 13, wherein each component base type object is associated with a plurality of component objects that are associated with the plurality of components, each component object having attributes providing information related to the plurality of components.

15. A system, comprising:
a memory containing machine readable medium comprising machine executable code having stored thereon instructions; and a processor module coupled to the memory, the processor module configured to execute the machine executable code to:
generate relationship objects for a data structure indicating relationships between components of computing, networking and storage resources used for storing and retrieving data in a networked storage system in a first configuration of a first storage solution having a plurality of configurations;
wherein the relationship objects define a relationship between the first and a second storage solution with overlapping compatible components, and the relationship objects provide a spanning tree structure for making changes to the first configuration;
determine, based on the data structure, that the first configuration is not upgradable to a latest configuration, different from the first configuration;
iterate through the data structure to identify a second configuration from the second storage solution that is upgradable to the latest configuration;
generate a message upon detecting any incompatibility between certain components of one of the latest configuration and the second configuration; and
indicate that the second configuration is unsupported, when a plurality of components of the second configuration do not match any configuration in the data structure.

16. The system of claim 15, wherein the message is an error message that is generated when two nodes of the networked storage system execute different storage operating system versions.

17. The system of claim 15, wherein the message is an error message that is generated when two same network switches of the networked storage system use a different firmware version.

18. The system of claim 15, wherein the data structure includes a first solution object for uniquely identifying the first storage solution and the first solution object is associated with a plurality of configuration objects associated with the plurality of configurations.

19. The system of claim 18, wherein each configuration object provides a unique configuration identifier, a configuration version identifier and a configuration owner.

20. The system of claim 19, wherein each configuration object is associated with a plurality of component base type objects, each component base type object indicating a component type that is uniquely identified; and each component base type object is associated with a plurality of component objects that are associated with the plurality of components, each component object having attributes providing information related to the plurality of components.

* * * * *